United States Patent [19]
Egbert

[11] Patent Number: 5,165,826
[45] Date of Patent: Nov. 24, 1992

[54] PNEUMATIC CARRIER MATRIX INTERCHANGE

[76] Inventor: Allen Egbert, 6328 Pitcairn, Cypress, Calif. 90630

[21] Appl. No.: 639,207

[22] Filed: Jan. 9, 1991

[51] Int. Cl.⁵ ............................................. B65G 51/24
[52] U.S. Cl. ..................................................... 406/182
[58] Field of Search ................................... 406/1, 182

[56] References Cited

U.S. PATENT DOCUMENTS

| | | | |
|---|---|---|---|
| 721,743 | 3/1903 | Richmond | 406/182 |
| 4,157,848 | 6/1979 | Smoot | 406/182 |
| 4,834,004 | 5/1989 | Butuk et al. | 406/182 X |

FOREIGN PATENT DOCUMENTS

| | | | |
|---|---|---|---|
| 51275 | 7/1974 | Australia | 406/182 |
| 969991 | 6/1975 | Canada | 406/182 |
| 696124 | 9/1940 | Fed. Rep. of Germany | 406/182 |
| 145029 | 11/1981 | Japan | 406/182 |

*Primary Examiner*—Margaret A. Focarino
*Assistant Examiner*—Gary C. Hoge
*Attorney, Agent, or Firm*—Michael R. Collins

[57] ABSTRACT

A device for directing or switching pneumatically sealed tubes for transporting carriers from one receive/-send station to another in a pneumatic system. The matrix configuration enables directional changes to single or multiple paths with the use of fewer diverting stations. The pressure and vacuum system is controlled at the line tubes by standard check valves and other pneumatic system devices.

3 Claims, 2 Drawing Sheets

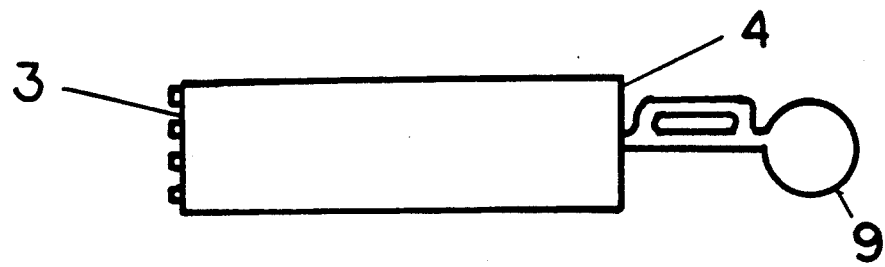
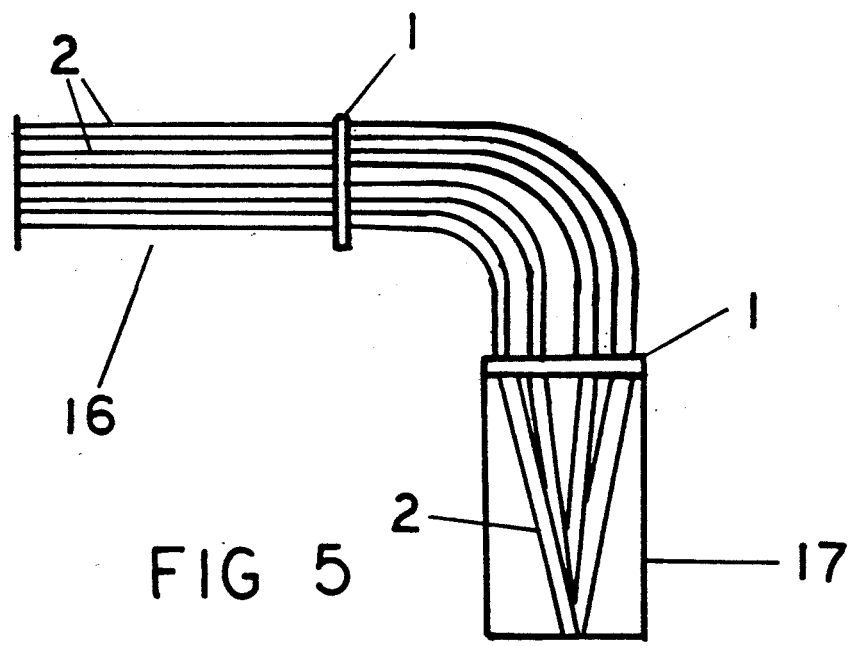

PNEUMATIC CARRIER MATRIX INTERCHANGE

FIELD OF THE INVENTION

The present invention relates to systems which direct pneumatically sealed tubes for the transportation of a carrier. The apparatus incorporates a matrix configuration to systematically direct the carrier tubes from receiving and dispatching stations in order to transfer pneumatic carriers from one station to another. Many path possibilities are accessible.

2. Description of Prior Art

Currently in use are systems which transport carriers through pneumatic tubes by diverting from one to a multiple number of paths and vice versa. Also available are systems diverting from groups of diverters to any number of other groups. The present invention is an improvement on the path transition or switching. The matrix interchange avoids the need for a complicated diverter station with many tubes to provide interconnection between elements and rather employs in its place a directional system with only as many tubes as input/output lines. It also allows the option of pressure and vacuum control at the tubes. The present invention allows the interchange unit to be installed in a straight, long configuration or broken into parts and installed at various angles to fit in confined places.

The present invention improves the advantages of a pneumatic carrier system by employing a plurality of tubes in a matrix interchange. The result is a simpler, smaller more efficient directional system for carrier transportation.

SUMMARY OF THE INVENTION

A primary objective of the present invention is to improve pneumatic carrier systems by using a directional matrix system to switch pneumatic carriers efficiently between tubes and receiving/dispatching stations. Another objective is to provide a small, simple switching or redirecting unit for installation and ease of maintenance of pneumatic systems.

In accordance with the description present herein other objects of this invention will become apparent when the description and drawings presented are reviewed.

BRIEF DESCRIPTION OF THE DRAWINGS

FIG. 4 schematically illustrates the matrix interchange with other pneumatic tube system elements.

FIG. 5 illustrates an optional configuration of the matrix interchange.

DESCRIPTION OF THE PREFERRED EMBODIMENT

The matrix interchange is a device for switching or redirecting pneumatic carriers between transport tubes to provide a means for transferring carriers from one receiving/dispatching station to another. The device is small and simple in the components contained within it to allow installation in confined areas and to provide ease of maintenance.

Figure 1:
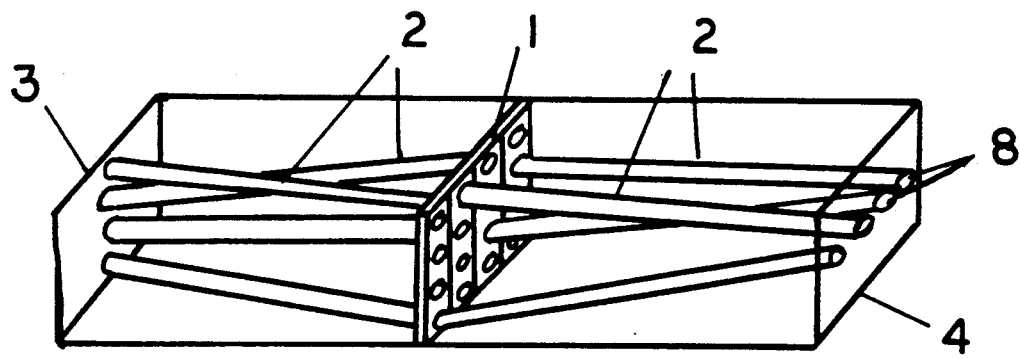
FIG. 1 illustrates a perspective view of the matrix interchange as an open frame box.

FIG. 1 is a perspective view of the matrix interchange. All of the elements can be enclosed in a single rectangular box or in two boxes split at roughly the middle point where the matrix plate (1) is located. FIG. 1 represents the integral or single enclosure configuration of the matrix interchange. Shown is a four by four matrix unit.

Figure 2A:
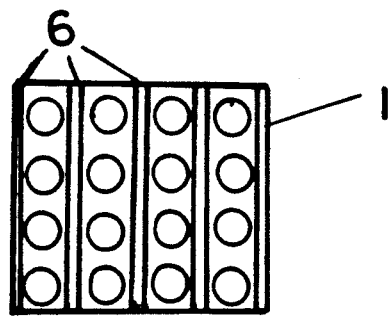
FIG. 2A illustrates the side of the matrix plate connected to the pressure/vacuum end.
Figure 2B:
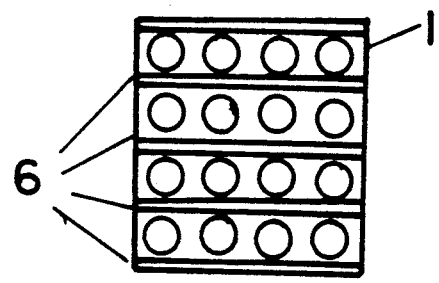
FIG. 2B illustrates the side of the matrix plate connected to the input/output end.
Figure 3:
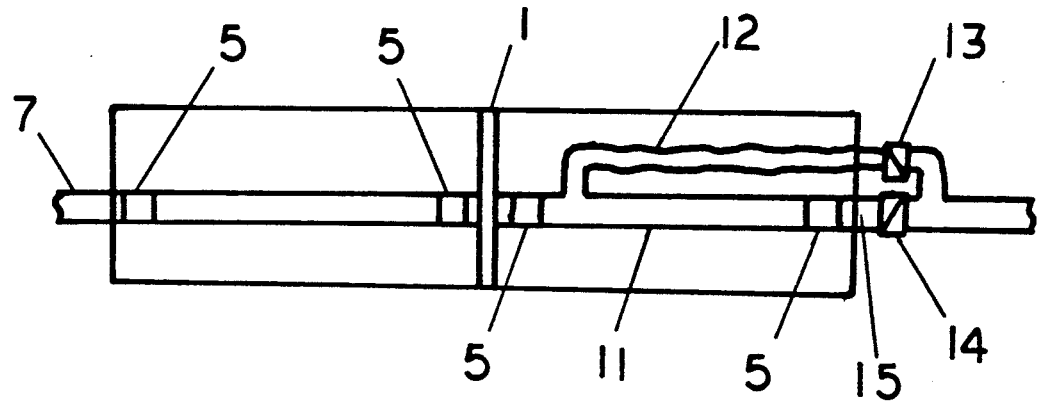
FIG. 3 illustrates an optional version of the matrix interchange with stopping chamber in the unit.

Referring to FIGS. 1 through 3, a matrix plate (1) is connected to an input/output end (3) and pressure/vacuum end (4) by pneumatic pipe assemblies (2). The pipe assembly (2) is a pneumatically sealed tube with flexible joints (5) rigidly fixed at one end to the input/output end (3) or pressure/vacuum end (4).

The pipe end opposite the rigid mount is retained in tracks (6), but allowed to move freely either horizontally or vertically on the matrix plate (1). In implementation, on one side of the matrix plate (1) the tracks (6) are all oriented vertically and on the opposite side the tracks (6) are oriented horizontally. This allows the connection of any input/output port (7) to be connected to any pressure/vacuum port (8) at any specific instant.

FIG. 4 shows schematically the matrix interchange with an input/output end (3) in a vertical configuration of four tubes to be connected to various receiving/dispatch stations and a pressure/vacuum end (4) connected to a blower and airshifter assembly (9) including a stopping chamber. Also shown is a controller (10) for purposes of signalling to the matrix interchange the position of the pipe assemblies (2) free ends on the matrix plate (1). The free ends are basically moved such that an input/output side is aligned with a pressure/vacuum side to allow the pneumatic carrier device to enter the matrix interchange and be stopped in a particular chamber (9). The pipe assemblies (2) are then moved or switched by the controller (10) to allow the carrier device to exit the matrix interchange on a different receiving/dispatch station tube.

As a pneumatic carrier is received and dispatched by the matrix interchange, the pipe assemblies (2) must be moved to the correct matrix plate (1) holes to allow receiving and dispatching. The controller (10) signals indicate the positions. The pipe assembly (2) free ends may be moved in the tracks (6) by any of several well known mechanical means such as hydraulic activators or by cable or chain controlled by electric motors.

In the case of each pipe assembly (2), it is moved in its track (6) to align with a matrix plate (1) hole position. The matrix plate (1) in FIG. 2 shows a four-by-four configuration but other configurations are possible such as two-by-two or six-by-six and even larger. Also uneven matrix combinations are possible such as two-by-three or three-by-two and other variations including larger numbers of pipes.

In the configuration shown in FIG. 1, a matrix interchange that is approximately 10 feet long with 2 foot square ends would provide sufficient length when a four inch pneumatic tube system is involved. Other configurations or differed pneumatic tube systems such as oval systems would require proportional changes in dimensions to allow for smooth transition of the pneumatic carrier through the flexible joints.

In an alternate configuration much of the length taken up by the need for a stopping chamber (11) can be incorporated into the matrix interchange as shown in figure 3. In this configuration, the stopping chamber

(11) for the pneumatic carrier is in the matrix interchange at the pressure/vacuum end (4). A flex hose (12) allows bypass of air in the system and the check valves (13) and (14) for control of pressure and vacuum are outside the matrix interchange at the pressure/vacuum end (4). A standard stopping pin (15) is provided for the pneumatic carrier to prevent any damage in case of failure.

Putting the length of tubing necessary for the stopping chamber (11) in the matrix interchange shortens the length of the space needed to install the matrix interchange. This makes for a more compact installation at a given site. It does complicate the matrix interchange by moving the tubing and other components in the unit. The check valves (13), (14) and blower and airshifter (9) can be located inside or outside the matrix interchange. Because of their size, the blower and airshifter are located outside.

Another option with the matrix interchange is to split the unit at the matrix plate (1). As shown in FIG. 5, this allows the use of pneumatic tubing between the input/output side (16) and the pressure/vacuum side (17) of the matrix interchange to provide installation in various angular positions. The pneumatic carrier is received on the input/output end (3) and routed to the proper matrix plate (1) hole in the input/output side (16). It then travels through a pneumatic tube to a matrix plate (1) hole in the pressure/vacuum side (16).

The matrix interchange provides an easier system for maintenance involving pneumatic carriers which may get caught while being routed. In current systems the carrier can get caught in two places, that is, in the diverters on the input side of a switching station and on the diverters used to exchange the carrier. The matrix interchange only has one potential catch point at the matrix plate (1) or transition point. If a pneumatic carrier should become caught in the matrix interchange, it can be easily removed by aligning the appropriate pipe assembly (2) at the matrix plate (1) with the opposite side of the matrix plate (1) open, that is, no pipe aligned opposite. If the carrier is caught at the matrix plate (1), the flexible joints (5) may be removed to gain access to the carrier.

The entire system shortens overall installation room requirements and reduces the number of diverters necessary in the system.

I claim:

1. A device for directing or switching pneumatically sealed tubes which transfers carriers using pressure and vacuum methods comprising:
   a. a matrix plate between an input/output end and a pressure/vacuum end with the matrix plate connected on one side to the input/output end by a first plurality of pipe assemblies and the matrix plate opposite side connected to the pressure/vacuum end by a second plurality of pipe assemblies;
   b. each first pipe assembly having an end rigidly attached to an input/output port on the input/output end and an opposite movable end moveably retained by two tracks on the matrix plate;
   c. each second pipe assembly having an end rigidly attached to a pressure/vacuum port on the pressure/vacuum end and an opposite end moveably retained by two tracks on the matrix plate;
   d. the pipe assemblies have a flexible joint near each end thereof sufficient to allow the movable end to move the length of the tracks on the matrix plate;
   e. the matrix plate having holes therein of the same diameter as the pipe assemblies to allow pipe assemblies on opposite sides of the matrix plate when aligned to pass a carrier of diameter and length small enough to traverse the pipes;
   f. a means for moving the movable pipe assembly end and properly aligning it with a selected matrix plate hole; and
   g. a means for creating fluid pressure and vacuum in the system.

2. A device for directing or switching as in claim 1 wherein a stopping chamber is contained in the pipe assemblies at the pressure/vacuum end and a flex hose joined to the stopping chamber.

3. A device for directing or switching as in claim 1 wherein the matrix plate is in two parts with a plurality of pneumatic tubes connection each matrix plate hole between the two parts.

* * * * *